M. WERK.
Decomposing Fats.
No. 21,711.
Patented Oct. 5, 1858.
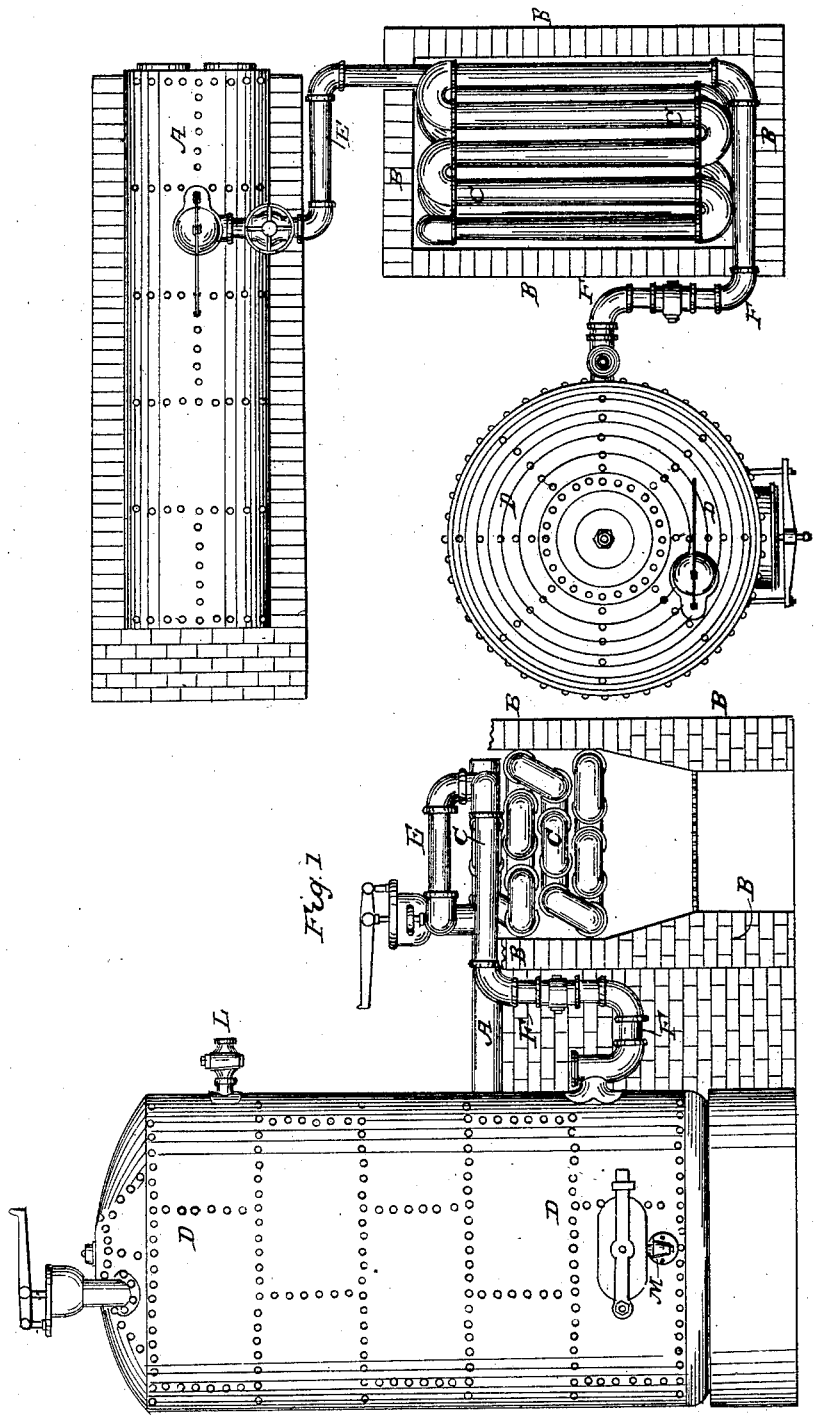

UNITED STATES PATENT OFFICE.

M. WERK, OF CINCINNATI, OHIO.

IMPROVEMENT IN APPARATUS FOR MANUFACTURING FATTY ACIDS.

Specification forming part of Letters Patent No. 21,711, dated October 5, 1858.

*To all whom it may concern:*

Be it known that I, M. WERK, of the city of Cincinnati, in the county of Hamilton and State of Ohio, have invented a new and Improved Apparatus for Manufacturing Fat Acids; and I do hereby declare that the following is a full, clear, and exact description of the same, reference being had to the accompanying drawings, making a part of this specification, in which—

Figure 1 is an elevation of the apparatus employed in performing my invention. Fig. 2 is a plan of the same.

Similar letters of reference indicate corresponding parts in both figures.

To enable others to make and use my invention, I will proceed to describe the manner in which it is performed and the apparatus I employ in the process represented in the drawings.

The fatty or oleaginous body to be treated is placed in a strong close vessel, into which the superheated steam is admitted, and in which the latter is allowed to act upon the body for a suitable length of time, which may be determined by practice or by tapping the vessel from time to time to analyze the contents. The superheated steam alone, of a temperature of from 800° to 900° Fahrenheit, will effect the decomposition; but acids or alkalies may be used in combination with the superheated steam to render so high a temperature unnecessary; and I find by experiment that by using about seven pounds of lime and fifty pounds of water, in the form of milk of lime, for every one hundred pounds of fatty or oleaginous matter a temperature of from 400° to 530° Fahrenheit will be sufficient for the superheated steam.

In the accompanying drawings, D is the vessel in which the decomposition is effected, furnished with a cock, L, near the top to admit the body to be treated, which should be first melted. A is a boiler for generating steam, and B is a superheating-furnace, containing a coil, C, to which the steam-pipe E from the boiler is connected, and from which a pipe, F, leads to the vessel D and circulates within the vessel in the form of a coil, which is perforated to admit the steam in numerous small streams.

The operation as generally conducted in the said apparatus is as follows: The tank is filled to a suitable height through the cock L, while the pipes E and F are closed by cocks provided for that purpose. Then, before the fire is lighted in the superheating-furnace B, steam is admitted from the boiler to the vessel D, which is kept at a temperature of about 212° Fahrenheit for about fifteen to twenty minutes, and then the milk of lime which is used is introduced through the cock L or another cock provided for that purpose. The cock is then closed and the fire lighted in the furnace B to superheat the steam, and the contents of the vessel D are subjected to the action of the steam for about from three to five hours. The contents of the vessel D are drawn through a cock, M, at or near the bottom after the decomposition is complete. The heat required for the superheated steam will be greater in proportion as less lime is used.

This discovery depends in the fact that fatty or oily bodies, whether animal or vegetable, when mixed with other bodies and subjected to steam of high temperature, will combine with them and produce fat-acids; and the nature of my invention consists in the combination and arrangement of the apparatus as herein set forth, for the saponification of fatty bodies.

My plan is substantially the direct application of superheated steam to the mass of oil or other fatty substances, and this producing fat-acids without distillation or the direct application of fire.

I do not claim the use of the boiler as new, or the use of a furnace for superheating steam as new, nor yet the use of a tank as new; but

What I claim as new is—

The combination of boiler, superheating-furnace, and tank for the production of fat-acids without distillation or direct application of fire, as herein set forth.

M. WERK.

Witnesses:
C. F. HAUSELMANN,
W. F. HAUSELMANN.